Patented May 14, 1935

2,001,167

UNITED STATES PATENT OFFICE 2,001,167

PROPELLER SHAFT

Benjamin A. Swennes, Rockford, Ill., assignor, by mesne assignments, to Borg-Warner Corporation, Chicago, Ill., a corporation of Illinois Application November 27, 1933, Serial No. 699,856

8 Claims. (Cl. 64—29)

This invention relates to propeller shafts for motor vehicles.

In the construction of motor vehicles considerable attention has been given to the matter of absorbing vibration and deadening sound. Practically every part of the car has been studied with that object in view but, so far as I am aware, there has been no improvement made in the propeller shaft to overcome the objectionable noise due to the resonance of this tubular part which asserts itself at certain critical speeds, nor any improvement with a view to diminishing if not entirely eliminating its susceptibility to transmitting vibrations, created or occurring in either of the mechanisms ahead and behind the propeller shaft. It is, therefore, the principal object of my invention to provide a non-resonant and vibration dampening propeller shaft.

The propeller shaft of my invention is tubular and sheathed inside or outside, or both inside and outside with material having a different period of vibration to dampen the vibration of the shaft and avoid the phenomena of resonance.

This application is a continuation in part of my copending application, Serial No. 615,917, filed June 7, 1932.

The invention is disclosed in the accompanying drawing, in which—

Figure 1 shows a propeller shaft and its universal joint connections, the shaft being sheathed in accordance with my invention as indicated in the cross-section, Fig. 2, and Fig. 3 is another cross-section similar to Fig. 2 but showing a modification in which sound deadening material is used as a coating on the inside of the shaft.

Similar reference numerals are applied to corresponding parts throughout the views.

Referring first to Figure 1, the propeller shaft is indicated by the reference numeral 10. It is tubular like other propeller shafts and joined at its rear end to the yoke 11 of a universal joint 12 to transmit power to the driven spindle in the rear axle housing of the motor vehicle on which the propeller shaft is mounted. The front end of the shaft carries a splined part 13 received within the slip yoke 14 of the front universal joint 15 so as to make connection with the gear set. The connections at the front and rear may be completed through the conventional coupling flanges 16 and 17, or in any other suitable or preferred manner.

The propeller shaft 10 is subjected to torsional, column or strut, and beam deflections. Being of regular section it is also subject to natural harmonic resonance. This resonance may be the result of the direct forces, above mentioned, or due to sympathetic harmonic resonance. That is to say, the deflections of an ordinary tubular propeller shaft incident to operation of the motor vehicle are found to cause a distinct noise attributable to the resonance of the part. Then, too, sympathetic vibration of an ordinary tubular propeller shaft causes a distinct noise to be heard at certain critical speeds where such vibration manifests itself. The vibrations which the propeller shaft may fall in with in the way of sympathetic vibrations, may be created or occur either in the rear axle or in any part of the mechanism in front of the propeller shaft, and, of course, some vibrations occurring ahead or behind the propeller shaft may be transmitted directly through the propeller shaft unless the same is properly constructed to dampen out such vibration. An ordinary propeller shaft being of tubular section also has a harmonic vibration by reason of the closed air space.

In accordance with my invention, the shaft 10 is sheathed internally and externally as indicated at 25 and 26, respectively, in Fig. 2. The sheathing may be of rubber or any other material suitable for the purpose either to dampen out the vibrations of the tubular shaft or to set up vibrations out of phase with the vibrations of the tubular shaft and thus provide a non-resonant propeller shaft, one which will operate without the objectionable noise experienced with other unimproved tubular propeller shafts. The sheathing, although shown inside and outside, may be provided on the inside alone or on the outside alone. In any event, it is apparent that very little weight is added to the shaft and the sheathing is truly concentric with the shaft and cannot, therefore, disturb dynamic balance. The sheathing may rely simply upon frictional contact with the walls of the shaft to accomplish the result intended, or may be suitably cemented in place.

In Fig. 3 I have shown a coating 27 of finely divided felt sprayed on the inside of the tubular shaft 10', using a suitable liquid cement in the spraying to cause the felt to adhere. This coating of felt is provided of the proper thickness to give the sound deadening effect desired and thus eliminate the phenomena of resonance.

It is believed the foregoing description conveys a good understanding of all of the objects and advantages of my invention. The appended claims have been drawn to cover all legitimate modifications and adaptations.

I claim:

1. In a motor vehicle power transmission train, a hollow propeller shaft having suitable power transmitting connections at opposite ends, and means of tubular form, so as to fit said shaft, engaging the walls thereof and having periodical vibrations during rotation out of phase with the vibrations of said walls whereby to buck the same and render the shaft substantially non-resonant.

2. In a motor vehicle power transmission train, a hollow propeller shaft having suitable power transmitting connections at opposite ends, and a member of tubular form and of a size to snugly fit said shaft, placed inside of said shaft in engagement with the walls thereof, said member being subject to vibration during rotation but out of phase with the vibrations of the walls of said shaft, whereby the assembled vibratory rotating parts serve to neutralize one another's vibration.

3. A propeller shaft comprising a rotary tubular member and tubular vibration dampening means snugly engaging the outside and inside of said member and rotatable therewith.

4. A propeller shaft for motor vehicles comprising a rotary tubular member having an internal tubular sheathing of non-metallic material rotatable therewith for the purpose stated.

5. A propeller shaft for motor vehicles comprising a rotary tubular member having an external tubular sheathing of non-metallic material rotatable therewith for the purpose stated.

6. A propeller shaft for motor vehicles comprising a rotary tubular member having internal and external tubular sheathings of non-metallic material rotatable therewith for the purpose stated.

7. A propeller shaft for motor vehicles comprising a tubular metallic member coated on the inside with a tubular layer of sound deadening material to render the member substantially non-resonant.

8. A propeller shaft for motor vehicles comprising a tubular metallic member having its walls coated with a tubular layer of sound deadening material to render the member substantially non-resonant.

BENJAMIN A. SWENNES.